US010024989B2

(12) United States Patent
Abma et al.

(10) Patent No.: US 10,024,989 B2
(45) Date of Patent: Jul. 17, 2018

(54) ANALYTICALLY GENERATED SHOOTING SCHEDULES FOR USE WITH PATTERNED AND SIMULTANEOUS SOURCE ACQUISITION

(71) Applicants: Raymond Lee Abma, Houston, TX (US); Allan Ross, Houston, TX (US)

(72) Inventors: Raymond Lee Abma, Houston, TX (US); Allan Ross, Houston, TX (US)

(73) Assignee: BP Corporation North America Inc., Houston, TX (US)

( * ) Notice: Subject to any disclaimer, the term of this patent is extended or adjusted under 35 U.S.C. 154(b) by 513 days.

(21) Appl. No.: 14/603,117

(22) Filed: Jan. 22, 2015

(65) Prior Publication Data

US 2015/0204991 A1    Jul. 23, 2015

Related U.S. Application Data

(60) Provisional application No. 61/930,211, filed on Jan. 22, 2014.

(51) Int. Cl.
*G01V 1/00*    (2006.01)

(52) U.S. Cl.
CPC .............. *G01V 1/003* (2013.01); *G01V 1/006* (2013.01)

(58) Field of Classification Search
CPC ............................... G01V 1/003; G01V 1/006
See application file for complete search history.

(56) References Cited

U.S. PATENT DOCUMENTS

| 5,924,049 | A | 7/1999 | Beasley | |
|---|---|---|---|---|
| 8,345,510 | B2 | 1/2013 | Hegna | |
| 2012/0147701 | A1* | 6/2012 | Ross | G01V 1/006 367/23 |
| 2013/0155810 | A1* | 6/2013 | Dowle | G01V 1/3861 367/23 |

FOREIGN PATENT DOCUMENTS

WO    2012078978    6/2012

OTHER PUBLICATIONS

PCT Search Report dated Jun. 18, 2015.
Ziolkowski, A.M., 1984, The Delft Air Gun Experiment, First Break, Jun. 1984, 9-18.
Ray Abma, et al, 2013, Popcorn shooting: Sparse inversion and the distribution of airgun array energy over time, SEG Technical Program Expanded Abstracts, Aug. 19, 2013, pp. 31-35, XP055194149.

* cited by examiner

*Primary Examiner* — Krystine E Breier
(74) *Attorney, Agent, or Firm* — Robert Hsiao

(57) ABSTRACT

According to an embodiment, there is provided a system and method of collecting seismic data using a predetermined pattern of source activations that is intended to control the properties of the resulting seismic signal. One embodiment utilizes a seismic source array (or, more generally, any collection of controllable sources) to create a series of spaced apart in time source activations, with the spacing and number of such activations being used to shape the resulting signal. In one method of building sweeps, the guns are fired at an increasing rate (decreasing time separation) as time goes by. Other patterns may be generated by decreasing the firing rate as time goes by, or some combination of the foregoing. In an embodiment, the rate of the increase or decrease in the firing rate will change from pattern to pattern.

19 Claims, 4 Drawing Sheets

ANALYTICALLY GENERATED SHOOTING SCHEDULES FOR USE WITH PATTERNED AND SIMULTANEOUS SOURCE ACQUISITION

CROSS REFERENCE TO RELATED APPLICATIONS

This application claims benefit of U.S. Provisional Patent Application Ser. No. 61/930,211 filed Jan. 22, 2014, and entitled "Analytically Generated Shooting Schedules for Use with Patterned and Simultaneous Source Acquisition," which is hereby incorporated herein by reference in its entirety. This application is related to U.S. Provisional Patent Application Ser. No. 61/421,274 filed Dec. 9, 2010; U.S. application Ser. No. 13/315,947 filed Dec. 9, 2011, and entitled "Seismic Acquisition Method and System"; U.S. Provisional Patent Application Ser. No. 61/503,407 filed Jun. 30, 2011, and entitled "Seismic Acquisition Methods for Marine Applications;" and U.S. patent application Ser. No. 13/315,851 filed Dec. 9, 2011. Each of the foregoing patent applications is hereby incorporated herein by reference in its entirety for all purposes.

TECHNICAL FIELD

This disclosure relates to the general subject of seismic surveillance and, in particular, to methods for acquiring seismic and other signals that are representative of the subsurface for purposes of seismic exploration and/or surveillance.

BACKGROUND

A seismic survey represents an attempt to image or map the subsurface of the earth by sending sound energy down into the ground and recording the "echoes" that return from the rock layers below. The source of the down-going sound energy might come, for example, from explosions or seismic vibrators on land, or air guns in marine environments. During a seismic survey, the energy source is placed at various locations near the surface of the earth above a geologic structure of interest. Each time the source is activated, it generates a seismic signal that travels downward through the earth. "Echoes" of that signal are then recorded at a great many locations on the surface. Multiple source/recording combinations are then combined to create a near continuous profile of the subsurface that can extend for many miles. In a two-dimensional (2-D) seismic survey, the recording locations are generally laid out along a single line, whereas in a three dimensional (3-D) survey the recording locations are distributed across the surface in a grid pattern. In simplest terms, a 2-D seismic line can be thought of as giving a cross sectional picture (vertical slice) of the earth layers as they exist directly beneath the recording locations. A 3-D survey produces a data "cube" or volume that is, at least conceptually, a 3-D picture of the subsurface that lies beneath the survey area. In reality, though, both 2-D and 3-D surveys interrogate some volume of earth lying beneath the area covered by the survey. Finally, a 4-D (or time-lapse) survey is one that is recorded over the same area at two or more different times. Obviously, if successive images of the subsurface are compared any changes that are observed (assuming differences in the source signature, receivers, recorders, ambient noise conditions, etc., are accounted for) will be attributable to changes in the subsurface.

A seismic survey is composed of a very large number of individual seismic recordings or traces. The digital samples in seismic data traces are usually acquired at 0.002 second (2 millisecond or "ms") intervals, although 4 millisecond and 1 millisecond sampling intervals are also common. Typical trace lengths are 5-16 seconds, which corresponds to 2500-8000 samples at a 2-millisecond interval. Conventionally each trace records one seismic source activation, so there is one trace for each live source location-receiver activation. In a typical 2-D survey, there will usually be several tens of thousands of traces, whereas in a 3-D survey the number of individual traces may run into the multiple millions of traces.

In seismic acquisition a marine source array, often an array of air guns, is composed of many single units that are towed behind one or more vessels that travels over the survey area. These units (e.g., air guns, water guns, sparkers, boomers, chip systems, water sirens, etc.) are typically hung in a line under a sausage buoy to allow them to be towed in a streamlined fashion. It is typical in deep water seismic surveying to use 6 to 15 guns under a single buoy.

Of recent interest is the use of so-called "Popcorn" survey techniques (as described more fully hereinafter) in marine seismic surveys. However, for all of the promise these sorts of surveys might hold, designing such surveys involves considerations that are different from those typically encountered in a conventional seismic survey.

It should be noted and remembered that the description which follows, together with the accompanying drawings, should not be construed as limiting the claims to the examples (or embodiments) shown and described. This is so because those skilled in the art to which the disclosure pertains will be able to devise other forms of this disclosure within the ambit of the appended claims.

SUMMARY

According to one aspect, there is provided a system and method of marine seismic exploration that allows seismic sources to be used more efficiently than has been possible heretofore and that provides a means of controlling the properties (e.g., frequency, maximum amplitude, etc.) of Popcorn-type pattern of source activations by adjusting the timing and subarray composition of the source activations.

According to an embodiment, there is provided a method of collecting seismic data using a predetermined pattern of source activations that is intended to control the properties of the resulting seismic signal. One embodiment utilizes a seismic source array (or, more generally, any collection of controllable source) to create a series of spaced apart (in time) source activations, with the spacing and number of such activations being used to shape the resulting signal. By way of analogy only, such a firing pattern can be thought of as being analogous in some ways to a Vibroseis sweep. In one method of building such sweeps, the guns will be fired at an increasing rate as time goes by, which could be considered to be comparable to like an up-sweep with Vibroseis. Other patterns may be generated by decreasing the firing rate as time goes by, or some combination of the foregoing. In an embodiment, the rate of the increase or decrease in the firing rate will change from pattern to pattern. One general goal in designing patterns could be to minimize the peak impulse while reducing the size of the correlation of any one pattern to that of any other pattern. Another goal might be to obtain firing patterns that do not have significant (e.g., distorting) notches in the resulting seismic signal.

According to an embodiment that is provided a method of seismic exploration for hydrocarbons within a region of the subsurface of the earth, wherein is provided a set of seismic sources, said set of seismic sources comprising a plurality of subarrays, each of said subarrays having one or more seismic sources associated therewith, the method comprising: selecting an analytic firing pattern; assigning each of said plurality of subarrays a different firing time within said analytic firing pattern, thereby forming a firing schedule having a corresponding plurality of firing intervals associated therewith; positioning said set of seismic sources at a first location proximate to the region of the subsurface of the earth; activating each of said subarrays according to said firing schedule; recording seismic data as each of said plurality of subarrays is activated; performing steps (d) and (e) at a plurality of different locations proximate to the region of the subsurface of the earth, thereby acquiring a Popcorn seismic survey; reconstructing said recorded seismic data from said Popcorn seismic survey, thereby obtaining a plurality of seismic traces; and, using said plurality of seismic traces to image at least a portion of the subsurface of the earth.

According to still another embodiment there is provided A method of seismic exploration for hydrocarbons within a region of the subsurface of the earth, wherein is provided a set of seismic sources, said set of seismic sources comprising a plurality of subarrays, each of said subarrays having one or more seismic sources associated therewith, the method comprising: determining an analytic firing pattern having a plurality of firing intervals associated therewith; assigning each of said plurality of subarrays a different firing time within said analytic firing pattern, thereby forming a firing schedule; positioning said set of seismic sources at a first location proximate to the region of the subsurface of the earth; activating each of said subarrays according to said firing schedule; recording seismic data as each of said plurality of subarrays is activated; performing this procedure at a plurality of different locations proximate to the region of the subsurface of the earth, thereby acquiring a Popcorn seismic survey; reconstructing said recorded seismic data from said Popcorn seismic survey, thereby obtaining a plurality of seismic traces; and, using said plurality of seismic traces to image at least a portion of the subsurface of the earth.

A seismic system suitable for use with an embodiment of the invention comprises a seismic source array comprising a plurality of seismic sources; and, a controller operatively coupled to the seismic source array, wherein the controller is programmed to activate the plurality of seismic sources according to one or more analytic firing patterns.

Another embodiment comprises A method of seismic exploration for hydrocarbons within a region of the subsurface of the earth, wherein is provided a set of seismic sources, said set of seismic sources comprising a plurality of subarrays, each of said subarrays having one or more seismic sources associated therewith, the method comprising: selecting a firing pattern, said firing pattern specifying an activation order for each of said subarrays and a time separation between each successive subarray activation, wherein said time separations between each successive subarray activation are either monotonically increasing in length or monotonically decreasing in length; positioning said set of seismic sources at a first location proximate to the region of the subsurface of the earth; activating each of said subarrays according to said firing pattern; recording seismic data as each of said plurality of subarrays is activated; performing this procedure at a plurality of different locations proximate to the region of the subsurface of the earth, thereby acquiring a Popcorn seismic survey; reconstructing said recorded seismic data from said Popcorn seismic survey, thereby obtaining a plurality of seismic traces; and, using said plurality of seismic traces to image at least a portion of the subsurface of the earth.

Other embodiments and variations are certainly possible within the scope of the instant disclosure and can readily be formulated by those of ordinary skill in the art based on the disclosure herein.

The foregoing has outlined in broad terms the more important features of the teachings herein so that the detailed description that follows may be more clearly understood, and so that the contribution of the instant inventors to the art may be better appreciated. This disclosure and the claims that follow are not to be limited in its application to the details of the construction and to the arrangements of the components set forth in the following description or illustrated in the drawings. Rather, the teachings are capable of other embodiments and of being practiced and carried out in various other ways not specifically enumerated herein. Finally, it should be understood that the phraseology and terminology employed herein are for the purpose of description and should not be regarded as limiting, unless the specification specifically so limits it.

BRIEF DESCRIPTION OF THE DRAWINGS

Other objects and advantages of embodiments will become apparent upon reading the following detailed description and upon reference to the drawings in which.

DETAILED DESCRIPTION

Figure 1:
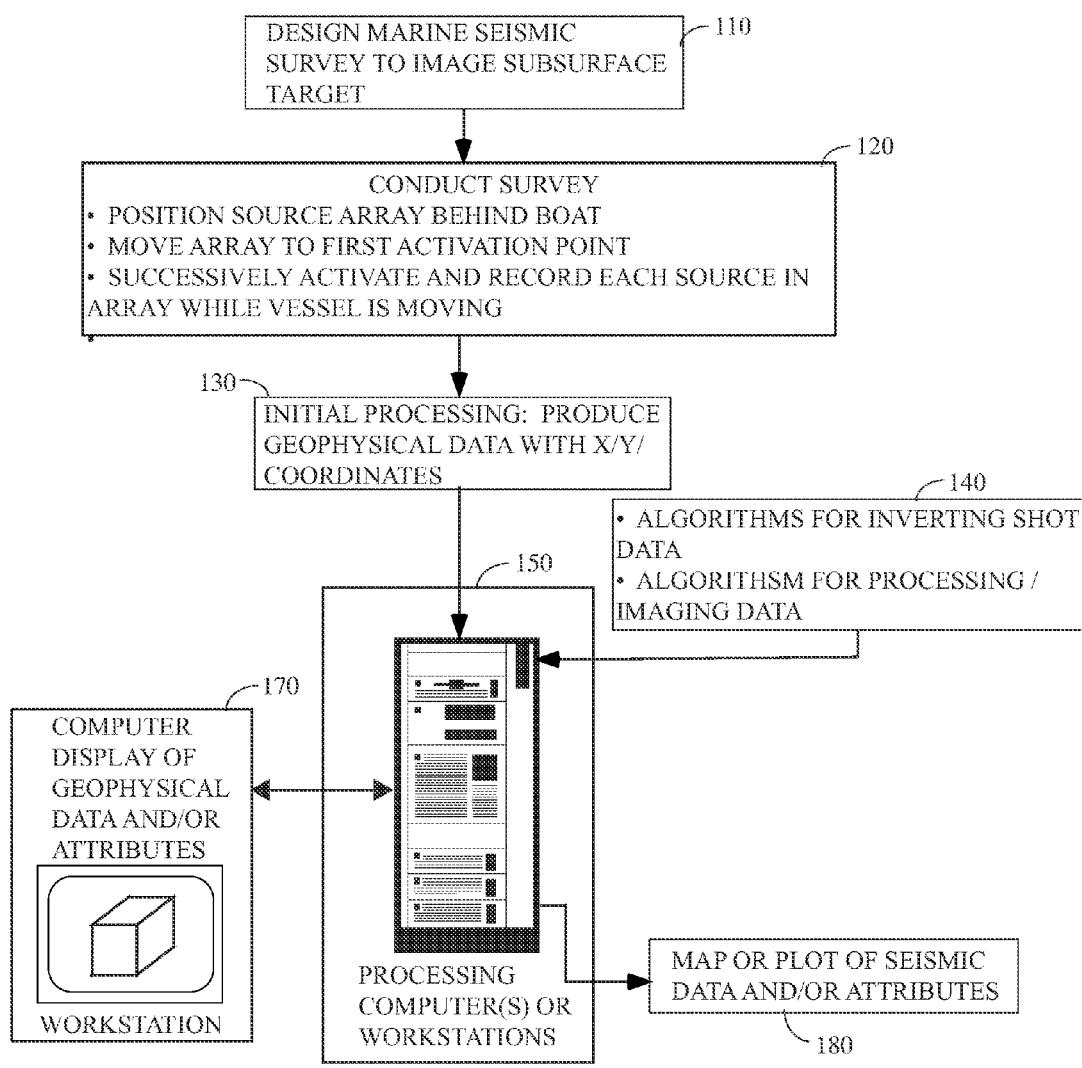
FIG. 1 illustrates a general processing environment.

While this disclosure is susceptible of embodiment in many different forms, there is shown in the drawings, and will herein be described hereinafter in detail, some specific embodiments. It should be understood, however, that the present disclosure is to be considered an exemplification of the principles thereof and is not intended to limit the disclosure to the specific embodiments or algorithms so described.

Unless indicated otherwise herein, the term "array" will be used to refer to the entire coordinated set of sources that are to be activated. These sources might all be activated simultaneously, sequentially (spaced apart in time or distance), randomly, etc. In the marine case, they could be towed by a single or multiple boats. A "subarray" is a collection of one or more individual sources within an array that are to be activated simultaneously. As an example, in FIG. 3 if all of the sources 350 were activated simultaneously, that would constitute a subarray of the entire array 330.

When the term "source" is used herein, it should be understood that, depending on the context, the reference is to a single source device, multiple source devices in a subarray, or both.

Note that, for purposes of the instant disclosure, the terms "firing pattern", "firing schedule", "shooting schedule", etc., will be used to refer to the activation timings of the sources in an array. Conventionally, the firing pattern would specify that all of the sources are to be activated simultaneously. However, according to an embodiment each of the sources might be separately activated. In still other instances, some sources will be activated individually and others activated in groups. In some embodiments a firing pattern will comprise a list of the sources in an array and relative activation times for each, where a "source" might be a subarray of multiple physical signal generating devices.

For purposes of the instant disclosure, the terms "firing pattern duration", "shooting schedule duration", etc., refer to the length of time over which sources are activated pursuant to the associated firing pattern. As specific examples, firing pattern durations of between about 1 second and 10 seconds, and every interval in between those limits could potentially be used. Note that it is anticipated that in some embodiments multiple firing pattern durations might be used, with a change in duration taking place at every source activation point, every other source activation point, etc. In some embodiments, choosing firing pattern durations that are different for adjacent source activations would be desirable.

Additionally, the terms "firing intervals", "source intervals" and "source spacings" as used herein will refer to the time periods between successive source activations in a firing pattern. For purposes of illustration, the "first" source interval will refer to the length of time between the first and second source activations, the "second" source interval will refer to the time period between the second and third source activations, etc., where "source" should be broadly construed to also include a subarray of multiple source devices that are all activated simultaneously. A given source interval could be equal to zero, but a plurality of them must be nonzero.

Further, for purposes of the instant disclosure, an "analytic" firing pattern will be understood to be one that that has firing intervals that are monotonically increasing, monotonically decreasing, or piecewise monotonic as is described in greater detail below.

Simultaneous source acquisition in the marine context, for example, is a method of increasing the shot spatial sampling density of a seismic survey without slowing down the speed of the shooting boat. A typical simultaneous source shooting example might activate the source arrays at half the time interval of that used in a conventional survey. This causes the shot records to overlap each other in time which is generally avoided in seismic acquisition.

For purposes of the instant disclosure, "simultaneous source" acquisition will be understood to be a method of seismic data collection where the signals from two or more successive source activations from the same source or another source overlap/materially interfere with each other. The source(s) at issue might be towed by the same or a different vessel. "Self-simultaneous sourcing" should be understood to refer to instances where the same source (including an array of individual sources) is activated in rapid enough succession that late arriving reflections from a first activation of that source overlap in time and materially interfere with early arriving reflections from one or more subsequent activations of that same or nearby source. As a specific example, successive source activations that are separated by 5 seconds could qualify as simultaneous sources if the trace (recording) length is longer than 5 seconds, e.g., 10 seconds.

"Popcorn shooting" as that term is used herein is the practice of sequentially activating the sources in an array (or other collection of sources) over a period of time instead of the conventional practice of simultaneously firing of all the guns in the array. Broadly speaking there are three variations of this approach. The first is Popcorn shooting where sources overlap each other but a particular source does not overlap itself. A second variation of Popcorn shooting is self-simultaneous source Popcorn in which one or more sources overlap themselves. Finally, in still another variation of Popcorn shooting, the instant system and method may be implemented where one source vessel (or, more generally, more than one survey crew) shoots against another.

Overlapping shots that are sufficiently spaced apart in time within a seismic recording can then be separated during processing according to methods described below including shot separation by inversion. Some variations of the Popcorn acquisition system and method taught herein may involve self-simultaneous sourcing but that is not a requirement.

Turning first to FIG. 1, this figure contains a general overview of an embodiment and its associated environment. As is indicated, generally speaking a marine seismic survey will be designed 100 and evaluated according to the methods, and using the algorithms (block 140), taught herein including, more specifically, analytic design of the shooting patterns. That means, as a specific example, an array (or some number of sub-arrays) will be selected together with two or more seismic sources that are to be towed behind the source boat. Those of ordinary skill in the art will understand how such is done and especially how such is done where the object is to image a particular subsurface target.

In the field, seismic data will be collected according to the instant disclosure (block 120). As is taught herein, individual sources within the array (or the multiple sources that comprise a subarray) will be activated and recorded according to the specified schedule that determines when a particular firing pattern will be used and the timing of the use of such pattern pursuant to the survey design 110, in many embodiments this will be while the vessel is in motion.

It is anticipated that according to an embodiment the vast majority of source activations will overlap (or be overlapped by) one or more other activations including, optionally, instances where a source might overlap itself (e.g., self-simultaneous sourcing). In some instances, the receivers will be sensors that are towed behind the source or another vessel. In other cases, the receivers might include ocean bottom receivers instead of (or in addition to) the towed geophone streamers.

Next, and as is conventionally done, some initial processing will be performed to associate each seismic recording with a surface or other location (block 130). This might be done in the field or in the processing center. In either case, a computer system 150, which might be a workstation, a server, a main frame, a parallel computer, a networked collection of computers or workstations, etc.

Next, the individual source or subarray activations will be identified and the processed to create a coded signal. According to an embodiment and is described more fully below, the source signatures from each of the sources will be used to reconstruct the recorded data into traces that are comparable to conventionally generated traces. In the event that self-simultaneous sourcing is employed, it may additionally be desirable to separate the overlapping shots according to methods well known to those of ordinary skill in the art (e.g., via sparse inversion). Algorithms that do deconvolution and separation (if needed) of seismic data will typically be made available to a computer that is to utilize them via access to some amount of local or remote hard disk or other storage (item 140). Additional algorithms useful in the processing of seismic data will be similarly provided to the CPU 150 which might be any conventional or unconventional programmable computing device.

Following identification and, if necessary, separation of the different seismic source recordings, the data will be processed as is generally discussed below depending on the survey design. In some instances the source activations might be combined in different ways to produce the same effect as a simultaneous excitation of the entire array or source set, combined in such a way as to focus the array to emphasize reflectivity from a particular target (e.g., via beam steering), or, combined to minimize the effect of the ghost notch, etc. The resulting data records will be seismic records that are comparable to those conventionally recorded by other methods.

The resulting seismic data might be used in any number of ways. Conventionally, the data will be processed and viewed on a computer display such as that of a workstation 170. Output from the seismic processing may be used to create maps or plots of seismic data and/or seismic attributes 180 according to methods well known to those of ordinary skill in the art.

Figure 2:
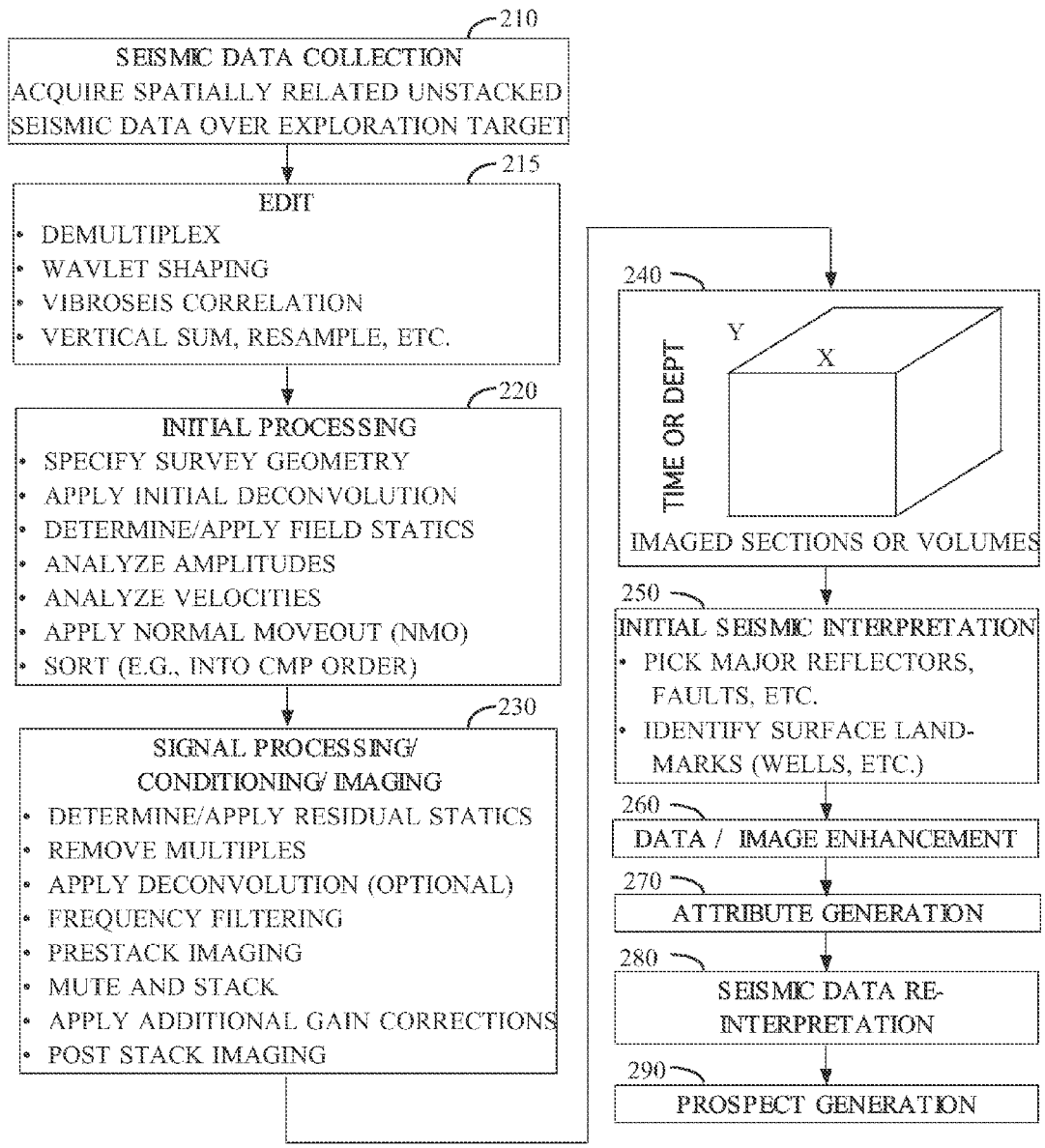
FIG. 2 contains an operating logic suitable for use with an embodiment.

FIG. 2 contains additional details of a typical seismic processing sequence that might begin with data collection according to the design considerations of the instant disclosure 210, editing 215, some sort of initial processing 220, conditioning of the signal and imaging 230, production of imaged sections or volumes 240, initial interpretation of the seismic data 250, further image enhancement consistent with the exploration objectives 260, generation of attributes from the processed seismic data 270, reinterpretation of the seismic data as needed 280, and ultimately generation of a drilling prospect 290. In an embodiment, one aspect of the Popcorn method could be implemented as part of block 215. Note that if an embodiment of the methods taught herein were implemented using land or marine vibrators, the vibrator correlation might be handled as part of this block and, in some cases, as part of the Popcorn reconstruction.

Figure 3:
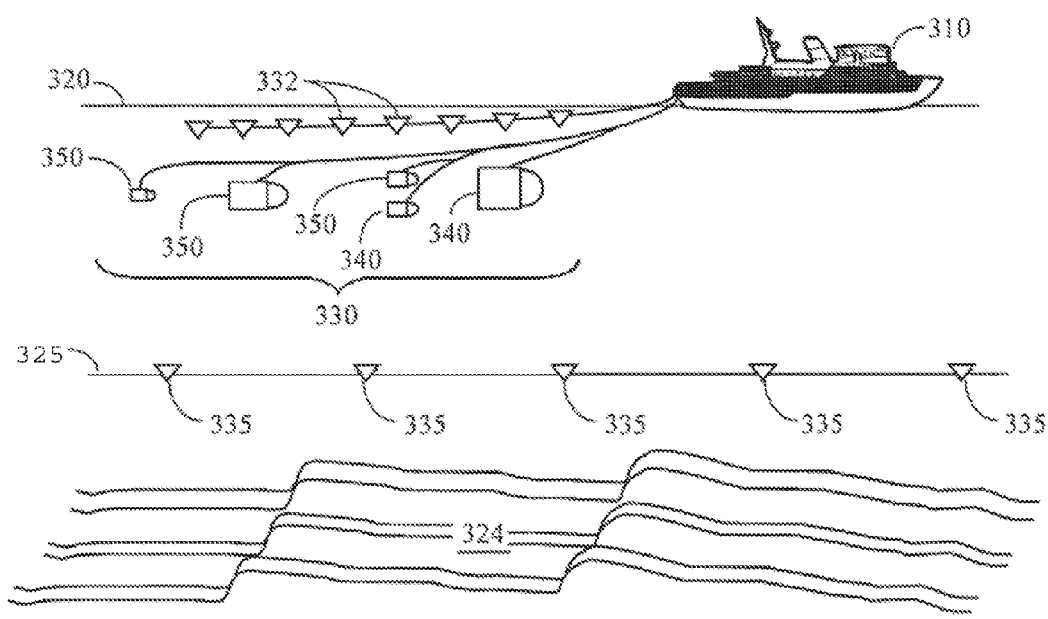
FIG. 3 illustrates an example marine environment.

FIG. 3 contains an illustration of an embodiment as it might be practiced in a marine environment. In an embodiment, one or more seismic vessels 310 will tow some number of receiver sensors 332 in a body of water 320. Additionally, at least one of the vessels 310 will tow a set 330 of seismic sources 340 and 350. Note that the sources 340/350 in the set 330 need not be the same size/capacity/frequency range and could possibly be towed at different depths. On the other hand, the sources 340/350 in the set could all be of the same size/capacity/frequency range and the fact that different sizes of representative icons were used in this figure should not be construed to limit the instant disclosure to only those arrays with sources of different sizes. In some embodiments, additional receivers 335 (e.g., ocean bottom receivers, receivers in well bores for use in a vertical seismic profile, etc.) will be situated on the ocean floor 325. A principal object of a seismic survey, of course, is to obtain an image of the subsurface configuration 324.

Continuing with the example of FIG. 3, in this figure each of the individual sources 340 and 350 in the set might get its own randomly generated firing schedule, independent of the others. As another example, the sources of FIG. 3 might be grouped into two subarrays and only two firing schedules would then need to be developed: one for sources 340 and another for sources 350. Those of ordinary skill in the art will readily be able to devise different combinations of sources, subarrays, and firing schedules that would be consistent with the spirit of the instant teachings.

In an embodiment, one way to design Popcorn patterns (FIG. 4) is via what will be referred to as the "analytic" method hereinafter. In one embodiment and as is generally set out in FIG. 4, the design process will start with determination of the number and sizes of the seismic sources that are available, the subsurface target parameters (e.g., depth, dip, thickness, velocities, etc.), and other sorts of information typically considered in planning a seismic survey (block 405). Methods of determining generally good parameter choices for a conventional seismic survey are well known to those of ordinary skill in the art.

For purposes of the instant disclosure, of particular importance is the selection of the number and sizes of the seismic sources (block 410). As will be discussed in greater detail below, such information about the sources will be used, in some embodiments, in connection with a program that generates synthetic seismic data in order to select a good or a best firing pattern or patterns for use in connection with the survey. Additionally, it is certainly possible that an initial choice of the number and sizes of seismic sources could be modified after such synthetics (or field tests, etc.) have been generated and studied. Thus, the selection of the survey parameters should be viewed as potentially being an iterative process with some parameter choices interacting with or determining other choices.

Next, in an embodiment a plurality of candidate firing schedules will be generated (block 415). In some embodiments, a goal would be to control the shape, frequency distribution, and/or other properties of the seismic waveform by adjusting the timing between the firing of subarrays in a firing pattern, i.e., via the analytic Popcorn approach taught herein. In some embodiments, the patterns will be chosen or not (block 416) according to one or more of the following guidelines:

The firing patterns will be chosen so that the time intervals between successive subarray activations decreases monotonically. Thus, this firing pattern can be thought of generally as "speeding up" the source activations in a manner that is reminiscent of a Vibroseis upsweep. In other cases, the firing patterns will be designed to have source intervals that increase monotonically (i.e., the source activations are "slowed down"). In still other cases, some combination might be used (e.g., an increase, followed by a decrease).

When choosing between firing patterns that are otherwise acceptable, the one that produces the smallest maximum source signal amplitude (i.e., the pattern that results in the smallest overall source amplitude) could be chosen.

Firing patterns could be chosen so that they are not too similar to each other and this would be especially useful with respect to firing patterns that are used at shot points that are proximate to each other.

Examination of the frequency spectra of seismic data collected according to each pattern can be used to select some patterns for inclusion or eliminate some patterns from consideration. In some cases, frequency spectra that have been calculated from synthetically or otherwise obtained seismic data collected by activation of a firing pattern could be reviewed for the presence or absence of frequency notches, peaks, etc.

In addition to the foregoing, other criteria that might be used include gun refill time requirements, air supply limits, reuse of guns within a Popcorn pattern, the availability of spare guns, the use of the air guns either to disrupt the water surface to attenuate the ghost notch or to suppress the bubble oscillations.

Further with respect to the foregoing, in some embodiments the sweeps will be linear, so that once the temporal length of the pattern and the smallest time interval between successive shots in the pattern is chosen, and, in some instances, the rate of increase/decrease of the shot spacing, the pattern will be specified. Clearly, other combinations of parameters are possible, e.g., the number of sources, the time interval between the first and second (or last and next-to-last) shots, the rate of increase/decrease, etc. Those of ordinary skill in the art will readily be able to determine the combination of parameters that would uniquely specify a particular pattern. Further parameters such as these may be varied (e.g., systematically, algorithmically, randomly, etc.) to find a pattern that is acceptable in a particular survey location.

The rate of increase or decrease of the firing times can be roughly thought of to correspond to shrinking or stretching the chirp signal in a Vibroseis sweep. The length of the pattern will depend on the number of guns, the firing rate, and the change in the firing rate. In some embodiments there may be 45 to 60 guns in the array. However, the resulting patterns should not be so short that the maximum impulse (i.e., the maximum amplitude of the signal that is produced by a given pattern) becomes undesirably large or so long that the position of the shot has a spatial size that is too large. In some embodiments, a number of patterns might be generated either randomly and systematically and evaluated as to maximum amplitude, the presence of spectral notches within the seismic band, etc.

In one method of building sweeps the sources will be activated at an increasing rate as time goes by. Other patterns may be generated by decreasing the firing rate as time goes by. The rate of the increase or decrease in the firing rate could change from pattern to pattern. In an embodiment, one general goal would to minimize the peak impulse while reducing the size of the correlation of any one pattern to that of any other pattern.

One method of determining whether a particular pattern will be acceptable would be to generate synthetic seismograms using the parameters of the selected sources (e.g., typical source signatures, frequency content, etc. or each source) in combination with a candidate pattern. The frequency content or other characteristic of the resulting seismic signal (composite source signature) could then be analyzed to see if the resulting frequency content would be acceptable. For example, a composite source signature having frequency spectrum with relatively deep notches within the seismic bandwidth might be unacceptable depending on the anticipated subsurface configuration. Candidate source patterns could also be tested against subsurface geologic models to produce synthetic seismic traces and an associated synthetic seismic survey that provides an estimate of the actual subsurface response that would be obtained in the field if such a pattern were to be used. Of course, to the extent that important reflectors are imaged (or not) is another criterion that could be used to select firing patterns.

A complication potentially arises if the time separations between successive source activations are chosen to be nonlinearly spaced apart. As an example and by way of analogy, non-linear Vibroseis sweeps are designed to put more energy into the ground at some frequencies, typically the low ones. In present case, the frequency content is set by the individual airguns, and the shape of the pattern should be chosen such that it doesn't create any significant notches in the spectrum. Even this a strict requirement, since the notch could potentially filled in from nearby shots. However, the most accurate results will likely be obtained if the signal is as notch-free as possible.

In the case of a nonlinear source activation pattern, it might be desirable to avoid having two guns going off so close together in time that they create unacceptably high source amplitude. Depending on the particular pattern, a non-linear sweep might create some issues with respect to lowering the amplitude within certain frequency ranges, but this should not be a problem except in extreme cases. That being said, this same problem could arise even in the linear case. For example, consider a one second pattern where the first and second guns are separated by ¾ second, and the rest need to fit in the remaining ¼ second. Most of the remaining guns would be firing on top of each other which would typically be considered a situation to be avoided.

An additional concern is that it would generally be best if not too many of the sources have an identical time separation or time separations that are approximately the same. A likely result of multiple sources that fire sequentially at equally spaced intervals would be the introduction of a frequency notch that corresponds to the time delay. A few identical intervals could certainly be tolerated but such should generally be avoided unless there is a specific reason to do otherwise. Generally speaking, a good firing sequence would be one that doesn't create notches or attenuate a range of frequencies. Assuming that the duration of the pattern is long enough, most linear sweeps would not have this problem provided that they are arranged so as to not cluster the guns within too small a time interval.

With respect to the firing time duration, one important variable is the total number of source activations. As described above, in most embodiments it would be beneficial to not have the sources grouped too closely together. As such, and as one specific example, if 60 sources are to be activated separately according to a monotonically decreasing linear pattern, the firing time duration might extend for 5 to 10 seconds, with longer or shorter durations being chosen in some circumstances. Given some combination of the firing time duration, the number source activations, and/or the function that describes the changing time separations between source activations, one of ordinary skill in the art will readily be able to construct an associated firing pattern.

One example of a less than optimal shooting pattern would be to shoot an array at one depth at a given shot point, then shoot another array at another depth at the next shot point. In this case each shot point would have a significant spectral notch corresponding to the gun depth. Popcorn reconstruction would be possible with this configuration, but the reconstruction would not be as accurate as would be otherwise possible. A better set of patterns would be to have a combination of guns at both depths at every shot point. The combined set of guns would fill in the notches due to the depths of both sets of guns. Continuing this method, guns shot at every shot point with many different depths would tend to reduce the effect of the spectral notches that are due to the gun depths. This would make Popcorn reconstruction relatively easy and stable which would contribute to the accuracy of the results.

Figure 5:
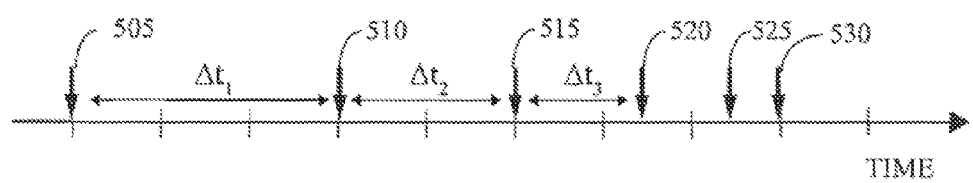
FIG. 5 illustrates a firing pattern timing suitable for use with an embodiment.

FIG. 5 contains a schematic illustration of how time intervals might be chosen in one embodiment. In this figure, the firing times for an array of seismic sources are represented as arrows 505-530, with source 505 being the first source in the array that is activated, followed by the second source 510, etc. As can be seen, in this example the firing delay or source interval ($\Delta t_i$) between successive activations decreases throughout the firing pattern. For example, $\Delta t_1$ (the time interval between the source 505 and source 510 activations) is greater than $\Delta t_2$ which is greater than $\Delta t_3$, etc. More generally, this means that:

$$\Delta t_i \leq \Delta t_j, \text{ for } i>j.$$

In this particular example, each source separation is shorter than the one that preceded it which implies an increasing rate of source activation. For purposes of the instant disclosure, firing intervals that satisfy the above inequality will be referred to as monotonically decreasing. Similarly, a monotonically increasing firing interval will be used to describe instances where the firing pattern source activation intervals regularly increase. It should be understood, though, that there must be at least two strict inequalities among the source intervals (e.g., $\Delta t_k < \Delta t_l$ for some k and l) in order to qualify as a monotonically increasing/decreasing firing pattern.

Additionally it should be noted that in some embodiments the firing intervals might be piecewise monotonically increasing, decreasing, or both. As an example, a simple piecewise monotonic collection of firing intervals might be defined as $$\Delta t_i \leq \Delta t_j, \text{ for } i>j, i,j \geq K$$

$$\Delta t_i \geq \Delta t_j, \text{ for } i>j, i,j \leq K.$$

Figure 6:
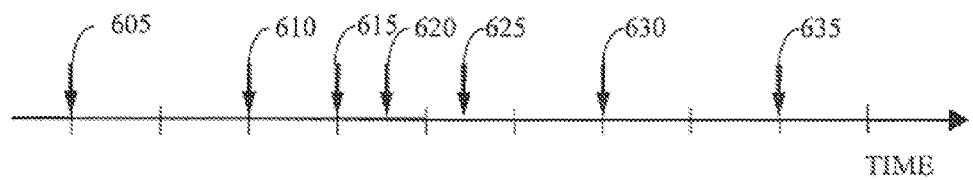
FIG. 6 illustrates a piecewise monotonic firing pattern suitable for use with an embodiment.

Turning to FIG. 6, this figure illustrates a simple two region piecewise monotonic firing pattern. In this particular example, the source separations for shots 605-620 are all decreasing monotonically, whereas source separations 620 through 635 are increasing monotonically. Clearly, there could be more than two regions and this is especially so where there are a large number of sources (e.g., 60 or so).

There might be other sorts of timing distributions, e.g., where each source separation is longer than the one before it (i.e., the rate of source activations is slowing down), one where each firing time interval is less than or equal to (or greater than or equal to) the one before it, etc. In other embodiments, the rate by which the source separations decrease (or increase) might be changed over time.

Additionally, other factors that might be considered in designing firing patterns would include whether to activate the sources in a subarray simultaneously or sequentially (e.g., should two sources in the array be simultaneously activated or separately activated). However, in most cases the firing pattern interval times will be monotonically increasing or decreasing, to include the case where some, but not all, of the interval times might be the same.

Returning now to FIG. 4, in some embodiments and as will be explained in greater detail below multiple analytic firing patterns will be created (boxes 415, 416, 417, and 418 in FIG. 4), evaluated and then, if found suitable, used during acquisition. That is, in some variations multiple firing patterns will be created and then used alternately—either deterministically or randomly—during the survey. In some embodiments the firing schedules will be changed every shot point so that the same firing schedule will not be used at two adjacent shot points. In some cases the firing patterns will be generated in the field in real-time or near real-time. In other instances, they will be generated in advance of conducting the survey during the design process.

Figure 4:
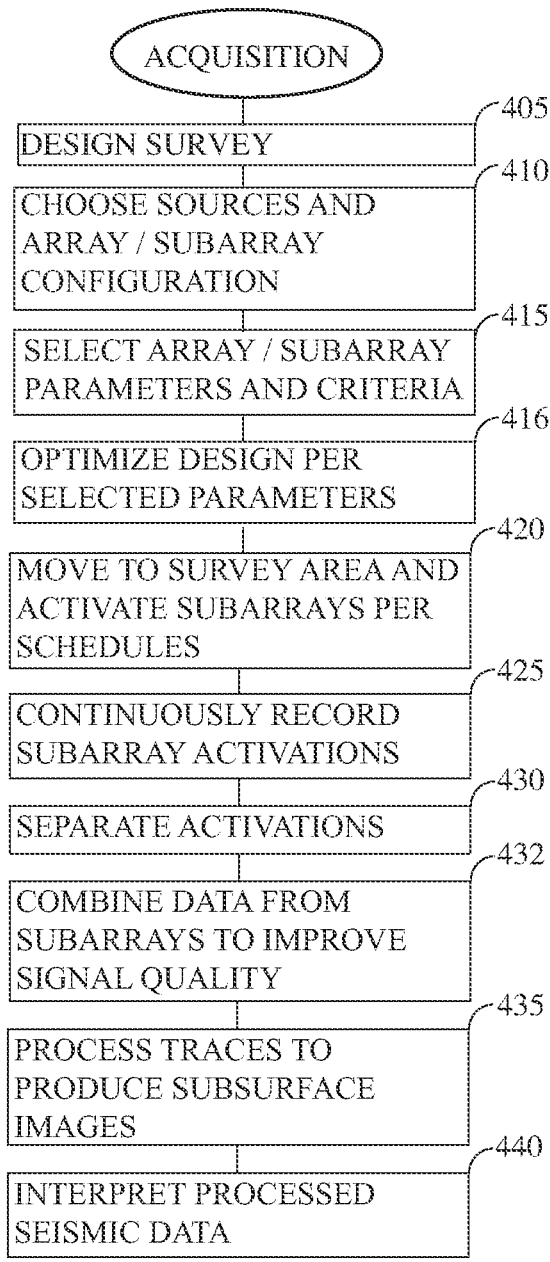
FIG. 4 contains an operating logic suitable for use with an embodiment.

After a firing pattern has been generated (box 415) according to the embodiment of FIG. 4, it will be examined to determine whether or not it would be a good candidate for use in the field (box 416). In an embodiment, some or all of the guidelines presented above will be used to screen candidate firing patterns. For example, the patterns generated by this method could be examined to see if there are significant notches or peaks in the spectrum of the pattern, as may happen if the pulses are unsuitably spaced. According to this embodiment, if a firing pattern is acceptable (the "YES" branch of decision item 416) it will be stored for subsequent use (box 417). However, if the firing pattern is not one that is deemed to be suitable, (the "NO" branch of decision item 416) another one can be generated.

Once a sufficient number of shooting schedules have been accumulated, (the "YES" branch of decision item 418) the schedules are ready to be utilized in the field (block 420). In some embodiments the sources will be continuously recorded while the shooting schedules are utilized (box 425) but in other instances a conventional recording approach will be utilized (i.e., start recording, activated sources at current shot point, end recording). Particularly careful design of the patterns may be needed for continuous Popcorn shooting. Continuous Popcorn allows the shot spacing to be a processing parameter, but continuous Popcorn also assumes a significant element of simultaneous shooting. In an embodiment, to ensure that the shots defined by the processing for a given shot spacing can be well separated, the Popcorn patterns used should be designed to work well with several possible shot spacings. While the patterns for adjacent shots will likely not be orthogonal, it would be better if the patterns avoided strong correlations when used with the various shot spacings that could possibly be utilized during the processing of the data. Those of ordinary skill in the art will readily be able to determine whether continuous, conventional, or some other recording approach would best be utilized in a particular case.

After acquisition according to the methods described herein, in some embodiments the data will be processed via sparse inversion (block 430) as is described in further detail below and then further processed (e.g., using some or all of the processes in FIG. 2) to produce subsurface images (block 435) for use in seismic exploration (block 440).

In an embodiment one goal will be to shape Popcorn-acquired seismic data to match or otherwise resemble the data that would have been created using a conventional airgun or airgun array with a known signature. Of course, given a known or estimated signature, the resulting seismic data can be further shaped to approximate a spike-like source according to methods well known to those or ordinary skill in the art (e.g., via deconvolution).

According to still other embodiments, simulated annealing, genetic algorithms, hybrid genetic algorithms, neural networks, expert systems and other artificial intelligence methods, and minimum entropy methods might be used to calculate suitable survey patterns. In brief, the problem of designing patterns is basically an optimization problem with a set of constraints and a set of goals. There will be some trade-offs between the different goals and the different constraints depending on the importance of the constraints and goals for any particular seismic survey.

Numerical experiments/simulations have shown that the instant approach can yield very good reconstructions, much better than may be needed in a practical sense.

After acquisition and continuing with block 430, each seismic data record will contain multiple source activations that will need to be processed to cause them to add constructively. That is, each trace can be thought of as being generated by a complex multi-spike source that is activated over some period of time. One method of shaping the resulting composite waveform to approximate a single spike is through an operation such as deconvolution. For purposes of the instant disclosure, the term "reconstruction" should be understood to mean the processing step(s) necessary to convert traces collected during a Popcorn survey into more conventional seismic traces.

In one embodiment the recorded seismic data "d" can be related to the desired unmixed/reconstructed source activations "m" through the following matrix equation:

$$d=Am,$$

where, "A" is a set, a matrix, or a linear operator of Popcorn signatures that are to be applied the signal, where a "Popcorn signature" is the composite signature that is formed when all of the sources in a set are activated according to the specified schedule. In some embodiments, a coherency condition ("C") might also be applied (e.g., the shot at one surface location will tend to resemble the shots at proximate locations, etc.):

$$d=Acm.$$

Since the matrix A is likely to be underdetermined, in some embodiments an iterative approach could be used to obtain d. One method of solving for d would be as follows;

Set m=0;

Set $d_{estimated}$=0

Calculated loop:

$$\Delta d = d - d_{estimated}$$

$$\Delta m = A^{-1} \Delta d$$

$$m = m + \Delta m,$$

apply coherency filter to m $$d_{estimated} = A\, m$$

Recalculate Δd, until the answer is satisfactory. As is indicated above, in an embodiment an FK transform, FX deconvolution, etc., might be used as a coherency filter to attenuate incoherent energy. In some applications, the transform might be applied to a common offset or common receiver gather by taking the FK transform and discarding (e.g., setting to zero) all values below a particular threshold value. Those of ordinary skill in the art will understand that the particular parameter values that control the coherency filter might need to be selected based on experience and/or on a trial and error basis but such is well within the skill of one who practices in this field. The selection of the coherency processing parameters might depend on quality of the recorded seismic data, the Popcorn patterns utilized, the array size, sources used, etc.

Continuous Popcorn allows the shot spacing to be a processing parameter, but continuous Popcorn may also involve a significant element of simultaneous and/or self-simultaneous sourcing and subsequent separation of the overlapping source activations. That being said, in many embodiments self-simultaneous sourcing will not be desired and, in such case, the data will not need to be separated and reconstruction can proceed as is discussed supra.

In the foregoing, much of the discussion has been discussed in terms of marine seismic surveys, but that was done for purposes of illustration only and not out of an intent to limit the application of the instant system and method to only those sorts of surveys. Those of ordinary skill in the art will understand how the embodiments presented supra could readily be applied to, by way of example, 2D, 3D, 4D, etc., marine surveys, land surveys, down hole It should also be noted and remembered that the embodiments presented herein are only given as examples and the teachings should not be limited to these examples unless specifically so indicated.

Further, although the text might have described the seismic sources as "guns", "airguns", etc., that was done only for purpose of illustration and any marine source including, without limitation, air guns, water guns, sparkers, boomers, chirp systems, water sirens, marine vibrators, etc., might potentially be used. Additionally, as noted previously the instant disclosure could be applied on land as well. Further, instances where the term "shot" was used herein should not be construed to limit the instant disclosure to only operating with impulsive sources. Thus, when the term "seismic survey" is used herein that term should be understood to apply to a survey on water, land, or any combination of same.

Still further, where reference is made herein to a method comprising two or more defined steps, the defined steps can be carried out in any order or simultaneously (except where context excludes that possibility), and the method can also include one or more other steps which are carried out before any of the defined steps, between two of the defined steps, or after all of the defined steps (except where context excludes that possibility).

Additional details related to the simultaneous source and self-simultaneous source methods may be found in one or more of the following references, the disclosures of which are incorporated herein by reference in their entirety and for all purposes as if fully set out at this point: (1) U.S. patent application Ser. No. 12/542,433 (now issued U.S. Pat. No. 8,295,124 B2, entitled "Method for Separating Independent Simultaneous Sources"); (2) U.S. patent application Ser. No. 12/851,590, (now issued U.S. Pat. No. 8,559,270 B2); and (3) U.S. patent application Ser. No. 13/315,925 entitled "Distance-And Frequency-Separated Swept-Frequency Seismic Sources".

Further, when in this document a range is given as "(a first number) to (a second number)" or "(a first number)-(a second number)", this means a range whose lower limit is the first number and whose upper limit is the second number. For example, 25 to 100 should be interpreted to mean a range whose lower limit is 25 and whose upper limit is 100. Additionally, it should be noted that where a range is given, every possible subrange or interval within that range is also specifically intended unless the context indicates to the contrary. For example, if the specification indicates a range of 25 to 100 such range is also intended to include subranges such as 26-100, 27-100, etc., 25-99, 25-98, etc., as well as any other possible combination of lower and upper values within the stated range, e.g., 33-47, 60-97, 41-45, 28-96, etc. Note that integer range values have been used in this paragraph for purposes of illustration only and decimal and fractional values (e.g., 46.7-91.3) should also be understood to be intended as possible subrange endpoints unless specifically excluded.

Further, it should be noted that terms of approximation (e.g., "about", "substantially", "approximately", etc.) are to be interpreted according to their ordinary and customary meanings as used in the associated art unless indicated otherwise herein. Absent a specific definition within this disclosure, and absent ordinary and customary usage in the associated art, such terms should be interpreted to be plus or minus 10% of the base value.

Additionally, while this disclosure is susceptible of embodiment in many different forms, there is shown in the drawings, and will herein be described hereinafter in detail, some specific embodiments. It should be understood, however, that the present disclosure is to be considered an exemplification of the principles of the system and method taught herein and is not intended to limit it to the specific embodiments or algorithms so described.

While the disclosed system and method has been described and illustrated herein by reference to certain embodiments in relation to the drawings attached hereto, various changes and further modifications, apart from those shown or suggested herein, may be made therein by those skilled in the art, without departing from the spirit of the inventive concept, the scope of which is to be determined by the following claims.

What is claimed is:

1. A method of seismic exploration for hydrocarbons within a region of the subsurface of the earth, wherein there is provided a set of seismic sources, said set of seismic sources comprising a plurality of subarrays, each of said subarrays having one or more seismic sources associated therewith, the method comprising:
   (a) selecting an analytic firing pattern;
   (b) assigning each of said plurality of subarrays a different firing time within said analytic firing pattern, thereby forming a firing schedule having a corresponding plurality of firing intervals associated therewith, wherein said plurality of firing intervals monotonically vary in length based on a number of seismic sources in the set of seismic sources and a size of each of the seismic sources in the set of seismic sources;
   (c) positioning said set of seismic sources at a first location proximate to the region of the subsurface of the earth;
   (d) activating each of said subarrays according to said firing schedule;
   (e) recording seismic data as each of said plurality of subarrays is activated;
   (f) performing steps (d) and (e) at a plurality of different locations proximate to the region of the subsurface of the earth, thereby acquiring a Popcorn seismic survey;
   (g) reconstructing said recorded seismic data from said Popcorn seismic survey, thereby obtaining a plurality of seismic traces; and,
   (h) using said plurality of seismic traces to image at least a portion of the subsurface of the earth.

2. The method of claim 1, wherein at least one of said subarrays comprises a single one of said set of seismic sources.

3. The method of claim 1, wherein at least steps (c) through (g) are performed a plurality of times at a plurality of different locations proximate to the region of the subsurface of the earth, thereby acquiring a seismic survey proximate to the region of the subsurface of the earth.

4. The method of claim 1, wherein at least steps (a) through (g) are performed a plurality of times at a plurality of different locations proximate to the region of the subsurface of the earth, thereby acquiring a seismic survey proximate to the region of the subsurface of the earth.

5. The method of claim 1, wherein said firing time duration is between one second and ten seconds.

6. The method of claim 1, wherein step (g) is performed by solving:

$$d=Am,$$

where m is said plurality of seismic traces obtained by reconstruction, d is said recorded seismic data, and A is a set of Popcorn signatures corresponding to said firing schedule.

7. The method of claim 1, wherein step (g) is performed by solving:

$$d=ACm,$$

where m is said plurality of seismic traces obtained by reconstruction, d is said recorded seismic data, A is a set of Popcorn signatures corresponding to said firing schedule, and C is a matrix of coherency conditions.

8. The method of claim 1 wherein said plurality of firing intervals are either monotonically increasing in length or monotonically decreasing in length.

9. The method of claim 1 wherein step (a) comprises the steps of:
   (a1) generating a plurality of candidate analytic firing patterns;
   (a2) determining a maximum amplitude of each of said plurality of candidate analytic firing patterns;
   (a3) determining which one of said candidate analytic firing patterns has a smallest maximum amplitude;
   (a4) selecting as said analytic firing pattern said determined one of said candidate analytic firing patterns which has said smallest maximum amplitude.

10. A method of seismic exploration for hydrocarbons within a region of the subsurface of the earth, wherein there is provided a set of seismic sources, said set of seismic sources comprising a plurality of subarrays, each of said subarrays having one or more seismic sources associated therewith, the method comprising:
    (a) determining an analytic firing pattern having a plurality of firing intervals associated therewith;
    (b) assigning each of said plurality of subarrays a different firing time within said analytic firing pattern, thereby forming a firing schedule, wherein said plurality of firing intervals monotonically vary in length based on a number of seismic sources in the set of seismic sources and a size of each of the seismic sources in the set of seismic sources;
    (c) positioning said set of seismic sources at a first location proximate to the region of the subsurface of the earth;
    (d) activating each of said subarrays according to said firing schedule;
    (e) recording seismic data as each of said plurality of subarrays is activated;
    (f) performing steps (d) and (e) at a plurality of different locations proximate to the region of the subsurface of the earth, thereby acquiring a Popcorn seismic survey;
    (g) reconstructing said recorded seismic data from said Popcorn seismic survey, thereby obtaining a plurality of seismic traces; and,
    (h) using said plurality of seismic traces to image at least a portion of the subsurface of the earth.

11. The method according to claim 10 where said firing intervals are either monotonically increasing or monotonically decreasing.

12. The method according to claim 10 where said firing intervals are piecewise monotonic.

13. The method of claim 10, wherein at least one of said subarrays comprises a single one of said set of seismic sources.

14. The method of claim 10, wherein at least steps (a) through (f) are performed a plurality of times at a plurality of different locations proximate to the region of the subsurface of the earth, thereby acquiring a seismic survey proximate to the region of the subsurface of the earth.

15. The method of claim 10, wherein said firing pattern has a firing time duration associated therewith, and wherein said firing time duration is between one second and ten seconds.

16. The method of claim 10, wherein step (g) is performed by solving:

$$d=Am,$$

where m is said plurality of seismic traces obtained by reconstruction, d is said recorded seismic data, and A is a set of Popcorn signatures corresponding to said firing schedule.

17. The method of claim 10, wherein step (g) is performed by solving:

$$d=ACm$$

where m is said plurality of seismic traces obtained by reconstruction, d is said recorded seismic data, A is a set of Popcorn signatures corresponding to said firing schedule, and C is a matrix of coherency conditions.

18. A method of seismic exploration for hydrocarbons within a region of the subsurface of the earth, wherein there is provided a set of seismic sources, said set of seismic sources comprising a plurality of subarrays, each of said subarrays having one or more seismic sources associated therewith, the method comprising:
(a) selecting a firing pattern, said firing pattern specifying an activation order for each of said subarrays and a time separation between each successive subarray activation, wherein said time separations between each successive subarray activation are either monotonically increasing in length or monotonically decreasing in length based on a number of seismic sources in the set of seismic sources and a size of each of the seismic sources in the set of seismic sources;
(b) positioning said set of seismic sources at a first location proximate to the region of the subsurface of the earth;
(c) activating each of said subarrays according to said firing pattern;
(d) recording seismic data as each of said plurality of subarrays is activated;
(e) performing steps (c) and (d) at a plurality of different locations proximate to the region of the subsurface of the earth, thereby acquiring a Popcorn seismic survey;
(f) reconstructing said recorded seismic data from said Popcorn seismic survey, thereby obtaining a plurality of seismic traces; and,
(g) using said plurality of seismic traces to image at least a portion of the subsurface of the earth.

19. The method of claim 18 wherein at least steps (a) though (d) are repeated a plurality of times for a plurality of different firing patterns.

* * * * *